(12) United States Patent
Crivelli (10) Patent No.: US 8,631,708 B2
(45) Date of Patent: *Jan. 21, 2014

(54) APPARATUS AND METHOD FOR MINIMIZING DRIFT OF A PIEZO-RESISTIVE PRESSURE SENSOR DUE TO THE PROGRESSIVE RELEASE OF MECHANICAL STRESS OVER TIME

(71) Applicant: Rocco Crivelli, Neuchatel (CH)

(72) Inventor: Rocco Crivelli, Neuchatel (CH)

(73) Assignee: Codman Neuro Sciences Sárl, Le Locle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,718

(22) Filed: Jan. 23, 2013

(65) Prior Publication Data

US 2013/0125659 A1 May 23, 2013

Related U.S. Application Data

(63) Continuation of application No. 12/660,496, filed on Feb. 27, 2010, now Pat. No. 8,393,222.

(51) Int. Cl.
*G01L 9/06* (2006.01)

(52) U.S. Cl.
USPC ............................. 73/721; 73/727; 361/283.4

(58) Field of Classification Search
None
See application file for complete search history.

(56) References Cited

U.S. PATENT DOCUMENTS

| | | | |
|---|---|---|---|
| 4,222,277 A * | 9/1980 | Kurtz et al. ..................... | 73/721 |
| 4,458,292 A | 7/1984 | Tward et al. | |
| 4,954,925 A | 9/1990 | Bullis et al. | |
| 4,975,390 A * | 12/1990 | Fujii et al. ........................ | 438/53 |
| 5,435,733 A * | 7/1995 | Chernicky et al. .............. | 439/68 |
| 5,440,931 A | 8/1995 | Wiegand et al. | |
| 5,444,901 A | 8/1995 | Wiegand et al. | |
| 5,531,121 A * | 7/1996 | Sparks et al. ................... | 73/716 |
| 5,535,752 A | 7/1996 | Halperin et al. | |
| 5,672,808 A | 9/1997 | Klauder et al. | |
| 5,836,063 A | 11/1998 | Hegner et al. | |
| 6,023,978 A | 2/2000 | Dauenhauer et al. | |
| 6,029,524 A | 2/2000 | Klauder et al. | |
| 6,229,190 B1 * | 5/2001 | Bryzek et al. ................. | 257/419 |
| 6,248,080 B1 | 6/2001 | Miesel et al. | |
| 6,272,928 B1 * | 8/2001 | Kurtz ............................. | 73/721 |
| 6,293,154 B1 * | 9/2001 | Kurtz ............................. | 73/727 |
| 6,874,367 B2 | 4/2005 | Jakobsen | |

(Continued)

FOREIGN PATENT DOCUMENTS

EP         1 184 351         3/2002

OTHER PUBLICATIONS

Co-owned, copending U.S. Appl. No. 12/660,496, filed Feb. 27, 2010.

*Primary Examiner* — Lisa Caputo
*Assistant Examiner* — Jermaine Jenkins
(74) *Attorney, Agent, or Firm* — Cheryl F. Cohen, LLC (57) ABSTRACT

An absolute piezo-resistive pressure sensor system and method employing multiple pressure sensing elements operating simultaneously to detect pressure. Both pressure sensing elements being subject to a common reference pressure within a sealed cavity. The first pressure sensing element detecting an offset voltage resulting from the progressive release of mechanical stress at an assembly interface between the sensing element and a base plate on which the sensing elements are assembled. Electronic circuitry compensates the pressure measured by the second pressure sensing element based on the offset voltage detected by the first pressure sensing element.

5 Claims, 6 Drawing Sheets

(56) References Cited

U.S. PATENT DOCUMENTS

| | | | | |
|---|---|---|---|---|
| 6,931,935 | B2 | 8/2005 | Bloomberg | |
| 6,968,744 | B1 | 11/2005 | Silverbrook et al. | |
| 7,028,550 | B2 | 4/2006 | Zdeblick et al. | |
| 7,073,387 | B2 | 7/2006 | Zdeblick et al. | |
| 7,107,854 | B1 | 9/2006 | Czarnocki | |
| 7,178,403 | B2 * | 2/2007 | Kurtz | 73/754 |
| 7,258,020 | B2 | 8/2007 | Silverbrook et al. | |
| 7,290,453 | B2 * | 11/2007 | Brosh | 73/720 |
| 7,322,236 | B2 | 1/2008 | Combi et al. | |
| 7,334,480 | B2 | 2/2008 | Silverbrook et al. | |
| 7,413,547 | B1 | 8/2008 | Lichtscheidl et al. | |
| 7,430,919 | B2 | 10/2008 | Silverbrook et al. | |
| 7,555,956 | B2 * | 7/2009 | Benzel et al. | 73/714 |
| 7,584,665 | B2 * | 9/2009 | Kurtz et al. | 73/721 |
| 7,775,127 | B2 * | 8/2010 | Wade | 73/861.52 |
| 7,788,981 | B2 * | 9/2010 | Schmid et al. | 73/721 |
| 7,823,455 | B2 | 11/2010 | Kurtz et al. | |
| 8,393,222 | B2 * | 3/2013 | Crivelli | 73/721 |
| 2005/0160827 | A1 | 7/2005 | Zdeblick et al. | |
| 2006/0081056 | A1 | 4/2006 | Silverbrook et al. | |
| 2007/0144266 | A1 | 6/2007 | Silverbrook et al. | |
| 2007/0283763 | A1 | 12/2007 | Silverbrook et al. | |
| 2008/0110270 | A1 | 5/2008 | Silverbrook et al. | |
| 2008/0173095 | A1 | 7/2008 | Silverbrook et al. | |
| 2008/0210012 | A1 | 9/2008 | Silverbrook et al. | |

\* cited by examiner

APPARATUS AND METHOD FOR MINIMIZING DRIFT OF A PIEZO-RESISTIVE PRESSURE SENSOR DUE TO THE PROGRESSIVE RELEASE OF MECHANICAL STRESS OVER TIME

CROSS-REFERENCE TO RELATED APPLICATIONS

This application is a continuation application of U.S. patent application Ser. No. 12/660,496, filed Feb. 27, 2010, which is herein incorporated by reference in its entirety.

BACKGROUND OF THE INVENTION

1. Field of the Invention

The present invention relates to an absolute piezo-resistive pressure sensor or transducer. More particularly, the invention relates to an apparatus and method for minimizing drift of an absolute piezo-resistive pressure sensor due to the progressive release of mechanical stress over time.

2. Description of Related Art

Absolute micro pressure sensors have a relatively thin silicon deflectable membrane that mechanically deflects under pressure. The mechanical deflection of the membrane is correlated to a pressure being measured on one side of the membrane. In order to measure an absolute pressure, the opposite side of the membrane is exposed to a substantially constant pressure created at the time of manufacture by a hermetically sealed cavity.

Figure 1:
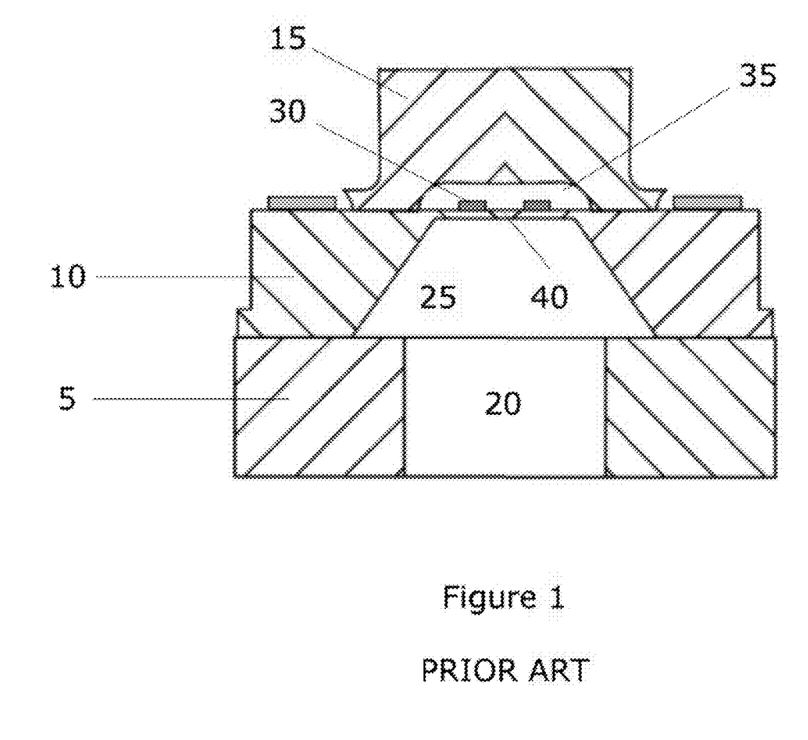
FIG. 1 is a cross-sectional view of a prior art absolute piezo-resistive pressure sensor.

FIG. 1 is a cross-sectional view of a prior an absolute piezo-resistive pressure sensor. Such a piezo-resistive sensor measures the mechanical deflection of a membrane or diaphragm by measuring a change in electrical resistance of a piezo-resistive film deposited or diffused on the membrane. A silicon wafer or die 10 is etched to form a cavity 25 closed at one end by a relatively thin deflectable membrane or diaphragm 40. One side of the membrane 40 is exposed to a pressure being measured (Pmeasured) within the cavity 25, while an opposite side of the membrane 40 is subject to an absolute or substantially constant reference pressure (Pref) within a hermetically sealed chamber 35 filled with gas. A piezo-resistive material or film 30 is deposited or diffused on the surface of the membrane within the hermetically sealed chamber 35. The silicon wafer 10 is assembled to a glass base plate 5 so that the membrane 40 is substantially aligned with an opening or hole 20 defined in the base plate 5.

Anodic bonding is a well known method for hermetically and permanently bonding silicon to glass without the use of adhesives. Silicon and glass components are heated to a temperature typically in the range of between approximately 300° C.-approximately 500° C. depending on the glass type. At such temperatures, alkali metal ions in the glass become mobile. A relatively high voltage (e.g., approximately 250 V-approximately 1000 V) is applied across the components as they are brought proximate or in contact with one another causing the alkali cations to migrate from the interface resulting in a depletion layer with relatively high electric field strength. The resulting electrostatic attraction brings the silicon and glass components into intimate contact with one another. Further current flow of the oxygen anions from the glass to the silicon results in an anodic reaction and hence a permanent chemical bond at the interface between the two components without the need for a bonding interface material or adhesive.

Figure 3:
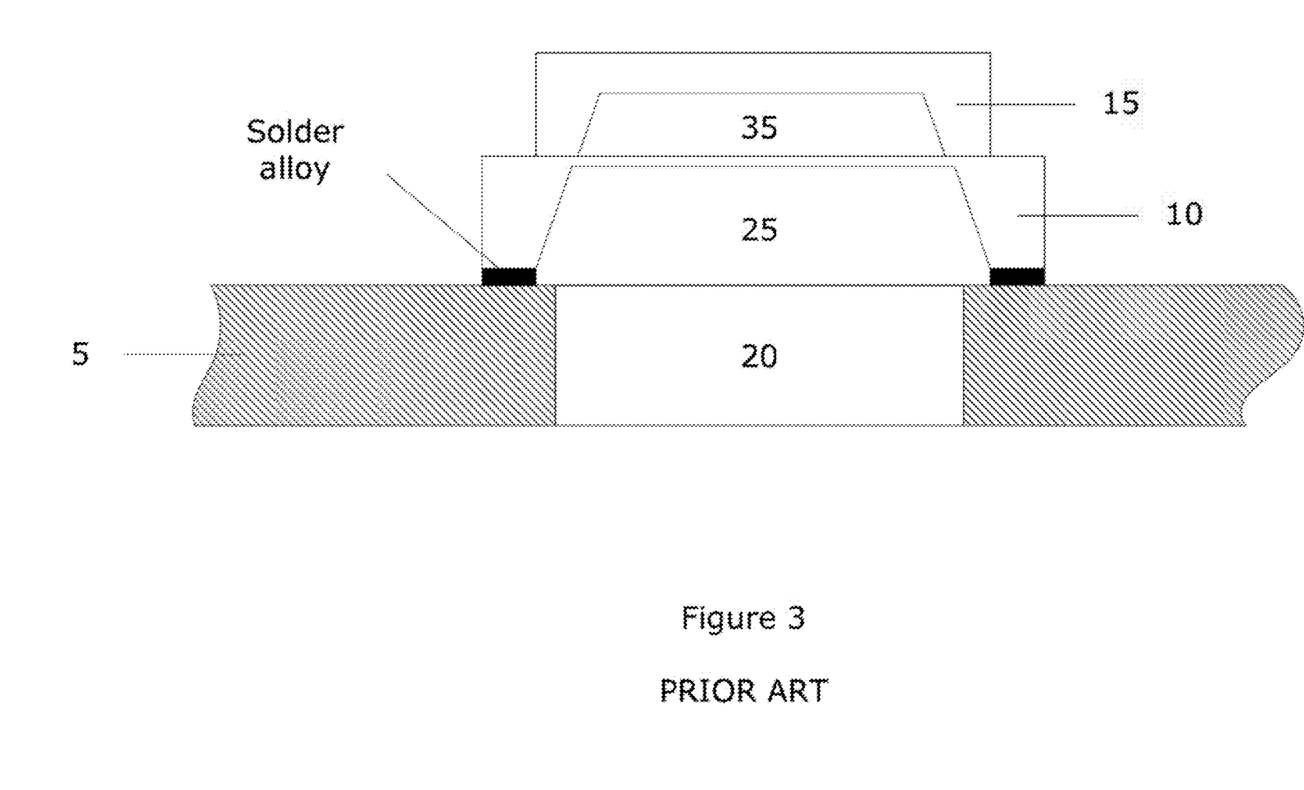
FIG. 3 is as side view assembly of the absolute piezo-resistive pressure sensor of FIG. 1 mounted to the base plate using a eutectic solder alloy.

FIG. 3 is a side view of the sensing element of FIG. 1 assembled to the glass base plate using an alternative eutectic solder alloy (e.g., 60SN40Pb solder alloy). This process requires the bonding surfaces to be plated with noble metals in layers preferably of only fractions of a micron thick. The mechanical stress resulting at the assembly interface and therefore at the deflectable membrane occurs over time due to aging effects regardless of the type of assembly method or process used. Another factor contributing to the overall mechanical stress results from temperature variations if the coefficient of thermal expansion of the sensing element and base plate (substrate) are not matched.

Figure 2:
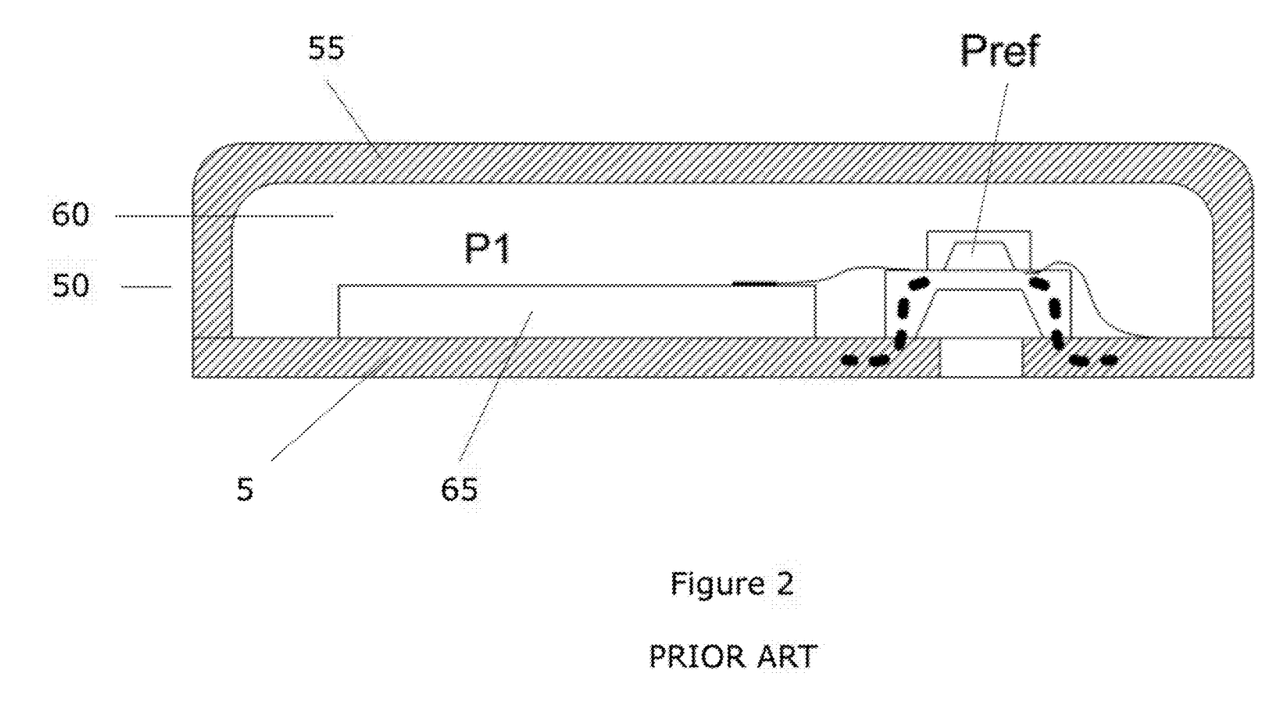
FIG. 2 is a cross-sectional view of a prior art hermetically sealed glass enclosure encapsulating the absolute piezo-resistive pressure sensor of FIG. 1.

In order to protect its electronic circuitry against malfunction when monitoring pressure within certain environments the piezo-resistive pressure transducer or sensor shown in FIG. 1 is encapsulated in a hermetically sealed packaging or enclosure 50 depicted in FIG. 2. EP Patent No. 1 184 351 discloses a method for brazing two glass components together in order to form a leak tight container for encapsulating electronic components such as a pressure transducer implanted in a human body. Enclosure 50 formed by cover 55 and base plate 5 are brazed together forming a hermetic seal. The enclosure is preferably made of glass and filled with a gas or fluid at a substantially constant pressure P1. Most preferably, glass enclosure 50 is filled with an inert gas such as helium or argon in order to prevent or minimize oxidation/aging of electronic circuitry 65 disposed therein. Another factor in the selection of the gas or fluid for filling enclosure 50, is that it preferably be compliant with a leak tester used for testing the implant hermeticity after encapsulation. The capsule or packaging is placed in a hermetically sealed helium chamber subject to a substantially constant pressure preferably in the range of approximately 100 mbar-approximately 1000 mbar to detect any helium molecules escaping or leaking from the capsule.

Over time the pressure sensor measurement response of a conventional absolute piezo-resistive pressure sensor will undesirably drift due to unwanted mechanical stress. It is therefore desirable to develop an improved absolute piezo-resistive pressure sensor that calibrates and then compensates for pressure sensor drift over time due to mechanical stress.

SUMMARY OF THE INVENTION

An aspect of the present invention is directed to an absolute piezo-resistive pressure sensor that compensates for long term drift associated with mechanical stress detected by a pressure sensor element separate from the pressure sensor element used to monitor the pressure being measured.

Another aspect of the present invention relates to an absolute piezo-resistive pressure sensor system and method employing multiple pressure sensing elements operating simultaneously to detect pressure. Both pressure sensing elements being subject to a common reference pressure within a sealed cavity. The first pressure sensing element detecting an offset voltage resulting from the progressive release of mechanical stress at an assembly interface between the sensing element and a base plate on which the sensing elements are assembled. Electronic circuitry compensates the pressure measured by the second pressure sensing element based on the offset voltage detected by the first pressure sensing element.

Yet another aspect of the present invention is directed to an absolute piezo-resistive pressure sensor system including a single wafer having respective first and second cavities etched therein forming respective first and second deflectable membranes serving as respective first and second pressure sensing elements. The first deflectable membrane has an aperture defined therethrough, while the second deflectable membrane does not. A first surface of each of the first and second deflectable membranes is exposed to a pressure within the respective first and second cavities. An opposing second surface of each of the first and second deflectable membranes is enclosed in a common hermetically sealed chamber formed by a cover assembled to the single wafer, wherein a pressure within the chamber is substantially constant. A piezo-resistive material is assembled to the opposing second surface of each of the first and second deflectable membranes subject to the same pressure within the sealed chamber. The wafer is assembled to a base plate having a hole defined therein such that the second pressure sensing element is substantially aligned with the hole. The present invention also relates to a method for using such a system wherein simultaneously while detecting using the second pressure sensing element a pressure in the second cavity, a measured offset voltage detected by the first pressure sensing element due to mechanical stress release at an assembly interface between the wafer and the base plate is calibrated. Electronic circuitry then compensates the pressure in the second cavity detected by the second pressure sensing element based on the offset voltage as calibrated by the first pressure sensing element.

Still another aspect of the present invention relates to an absolute piezo-resistive pressure sensor system including two wafers. A first wafer has a single cavity etched therein forming a first deflectable membrane serving as a first pressure sensing element. The first deflectable membrane has an aperture defined therethrough, a first surface exposed to a pressure within the single cavity etched in the first wafer, and an opposing second surface. A second wafer has a single cavity etched therein forming a second deflectable membrane serving as a second pressure sensing element. The second deflectable membrane does not have an aperture defined therein; but does have a first surface exposed to a pressure within the single cavity etched in the second wafer and an opposing second surface. Opposing second surfaces of the first and second deflectable membranes are enclosed in a common hermetically sealed chamber formed by a cover enclosing the two silicon wafers, wherein a pressure within the chamber is substantially constant. A common piezo-resistive material is assembled to each of the opposing second surfaces of the first and second deflectable membranes subject to the same pressure within the sealed chamber. A base plate having a single hole define therein; the first and second wafers being assembled to the base plate with the hole substantially aligned with the second pressure sensing element. The first and second wafers are fabricated using identical manufacturing steps, and the first and second pressure sensing elements are assembled using identical mounting steps. Also an aspect of the present invention is the method for using such a system by simultaneously while detecting using the second pressure sensing element a pressure in the second cavity, calibrating a measured offset voltage detected by the first pressure sensing element due to mechanical stress release at an assembly interface between the two wafers and the base plate. Thereafter, electronic circuitry is sued to compensate the pressure in the second cavity detected by the second pressure sensing element based on the offset voltage as calibrated by the first pressure sensing element.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

The accuracy or consistency of the pressure sensor measurements or readings depends on certain properties, characteristics or conditions ideally remaining substantially unchanged. Unfortunately, it is impossible to ideally maintain such constant conditions. Therefore, over time conventional absolute piezo-resistive pressure sensors or transducers always, but undesirably, exhibit a drift in pressure sensor measurements or readings.

Several factors have been recognized that contribute toward progressive drift in pressure sensor readings over time. During assembly of the silicon sensing element to the glass base plate (substrate), for example, using an anodic bonding process wherein the silicon sensing element is heated and an electrical field is applied thereto, residual mechanical stress may be trapped within the silicon sensing element structure.

Another identified contributing factor to mechanical stress occurs when the anodically bonded glass and silicon components have different or unmatched coefficients of thermal expansion (CTE). Thus, at the assembly interface between the two components, any change in temperature will effect the materials differently subjecting the silicon sensing element structure to mechanical stress. The greater the difference in CTE between the two components at the bonding interface the greater the mechanical stress imposed on the sensing element structure with variation in temperature.

Over time any trapped mechanical stress in the silicon sensing element structure dissipates thereby varying the mechanical deflection of the deflectable sensor membrane and, in turn, the electrical resistance of the piezo-resistive material deposited or diffused to the membrane, as denoted by the dashed line in FIG. 2. Such a change in electrical resistance will result in a drift of the pressure sensor response that undesirably effects the accuracy of the measurements or readings over time.

The present inventive system and method calibrates and then compensates for variation in mechanical deflection of the sensor membrane attributable to the progressive release of mechanical stress over time. To achieve this goal, the present inventive system employs two pressure sensing elements. A first pressure sensing element calibrates the impact of the progressive release of mechanical stress on the deflectable membrane while a second pressure sensing element is used to detect a pressure to be measured while compensating for the drift imposed by the progressive release of mechanical stress as calibrated by the first pressure sensing element.

Figure 4:
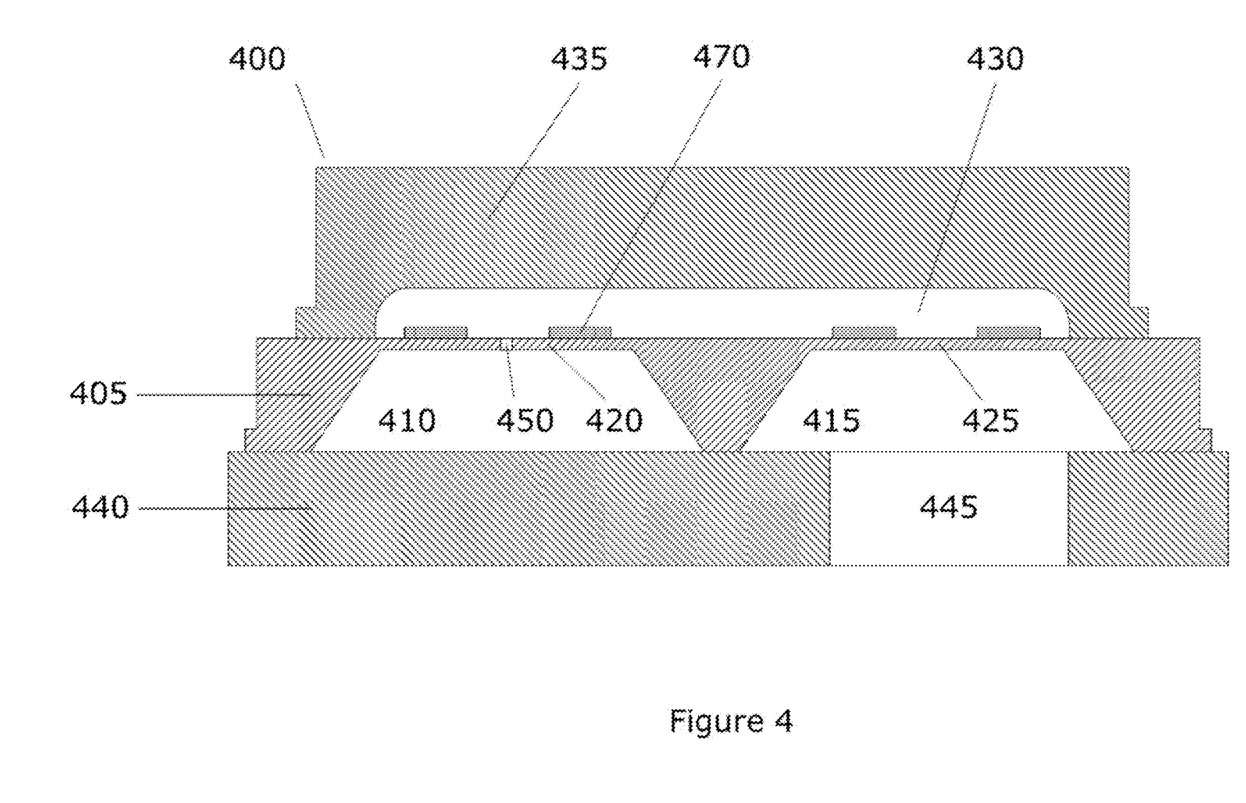
FIG. 4 is a cross-sectional view of a modified absolute piezo-resistive pressure sensor in accordance with the present invention fabricated from a single silicon wafer.

FIG. 4 is a cross-sectional view of an exemplary absolute piezo-resistive pressure sensor system 400 in accordance with the present invention. System 400 is preferably fabricated employing a single silicon wafer or die 405 having two cavities 410, 415 etched therein forming two respective deflectable membranes or diaphragms 420, 425 serving as two pressure sensing elements. One surface of the first and second deflectable membranes 420, 425 is exposed to a pressure within the respective first and second cavities 410, 415, while an opposing surface of the first and second deflectable membranes 420, 425 is enclosed in a common hermetically sealed chamber 430 at a substantially constant pressure (Pref) formed by a glass cover 435 bonded to the single silicon wafer or die 405. A piezo-resistive material 470 is deposited or diffused to that surface of the first and second deflectable membranes 420, 425 subject to the same pressure (Pref) within the sealed chamber 430. The silicon wafer 405 is, in turn, assembled (preferably anodically bonded, to a glass base plate 440 with a single hole or opening 445 defined therein and substantially aligned with the second sensing element (i.e., second cavity 415 and second delectable membrane 425). Preferably, the hole or opening 445 is in the range between approximately 0.5 mm-approximately 2.5 mm. The first deflectable membrane 420 has an aperture 450 defined therethrough (preferably between approximately 0.05 mm-approximately 0.1 mm), while the second deflectable membrane 425 does not. The silicon wafer 405 forming the two pressure sensing elements is itself encapsulated in a hermetically sealed chamber or packaging 450 formed by cover 455 and base plate 440 in accordance with known bonding or brazing techniques such as that disclosed in EP 1 184 351, assigned to the same company as that of the present invention and herein incorporated by reference in its entirety. Chamber 460 is preferably filled with a gas at a substantially constant pressure (P1), preferably an inert gas such as helium.

Figure 5:
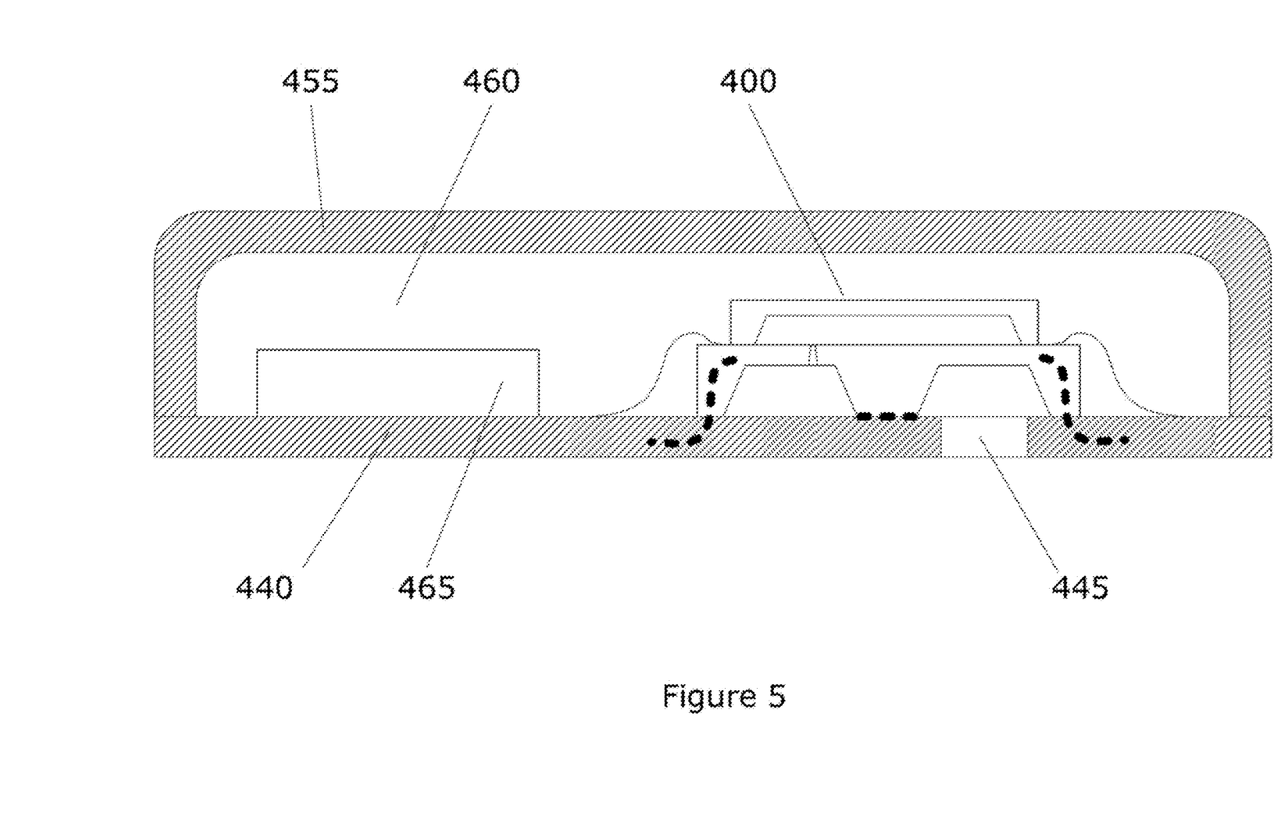
FIG. 5 is a cross-sectional view of the present inventive modified absolute piezo-resistive pressure sensor of FIG. 4 encapsulated in a hermetically sealed glass enclosure.
Figure 6:
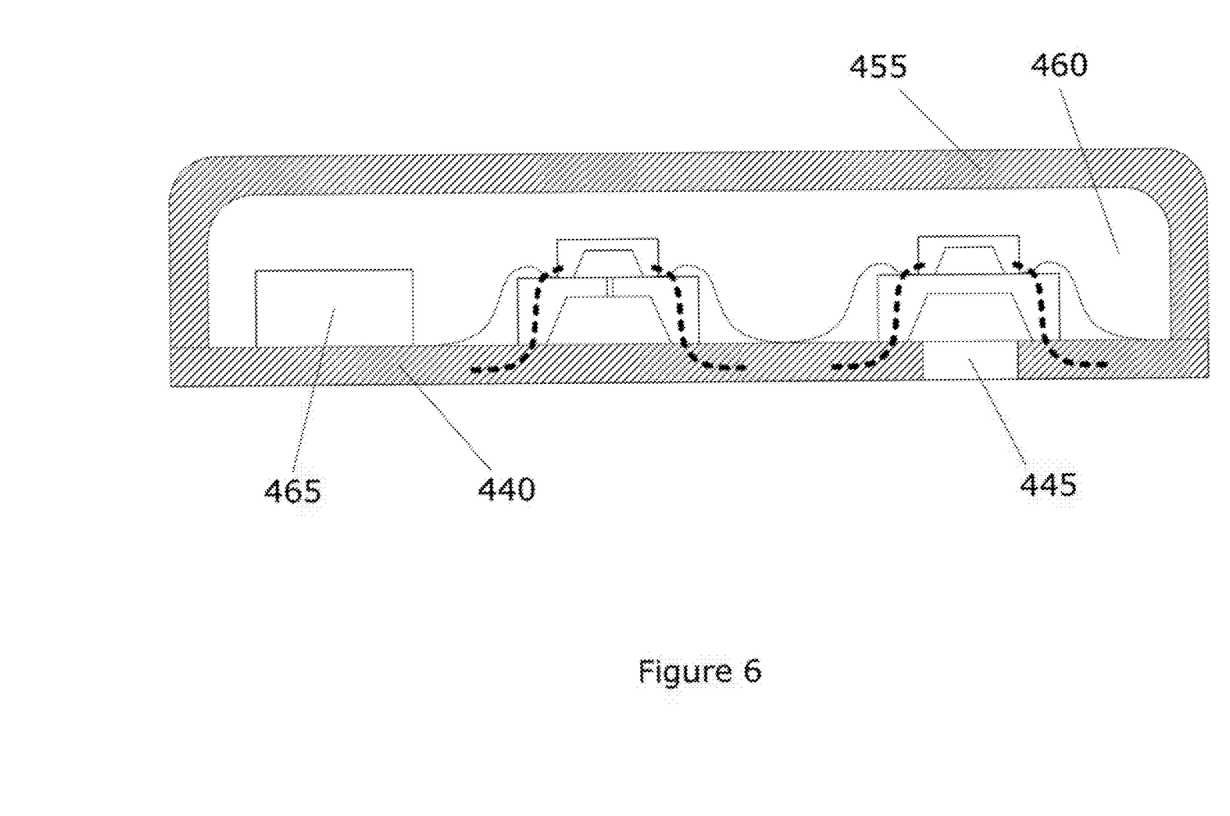
FIG. 6 is a cross-sectional view of a modified absolute piezo-resistive pressure sensor in accordance with the present invention fabricated using two silicon wafers.

As an alternative to fabricating the present inventive system using a single silicon wafer having two cavities defined therein forming two deflectable sensor membranes, two silicon wafers may be used to form separate sensing elements (as shown in FIG. 6), so long as both sensing elements are fabricated following identical manufacturing steps and thereafter simultaneously assembled to the glass base plate (substrate) following identical mounting steps. Applying the same fabrication and assembly steps insures that the drift from the progressive release of mechanical stress as experienced by the two pressure sensing elements will be the same. This two silicon wafer fabrication embodiment as shown in FIG. 6 can also be encapsulated by a cover 455 to form a chamber 460 (similar to that shown in FIG. 5 for the single wafer fabrication).

Due to the aperture 450 defined in the first deflectable membrane 420, both sides of the first deflectable membrane 420 are exposed to the same pressure, e.g., the substantially constant pressure in chamber 430 (Pref). Since chamber 430 is hermetically sealed the pressure (Pref) will remain substantially unchanged. Accordingly, any mechanical deflection of the first deflectable membrane 420 and change in resistance of the piezo-resistive film is deemed attributable to the progressive release of mechanical stress occurring at the assembly interface of the first sensing element to the glass base plate 440 (as denoted by the dashed lines in FIGS. 5 & 6). This variation in resistance is translated by the associated electronic circuitry 465 (signal processing and other electronic circuitry) into an electrical signal representing the current drift due to mechanical stress.

Accordingly, in operation, the pressure of both pressure sensing elements is detected simultaneously. Specifically, the piezo-resistive elements of each pressure sensing element are typically connected as a Wheatstone bridge to measure detect changes in resistance. The Wheatstone bridge passes a current through the sensors and measures the output voltage. When the resistance changes, less current passes through the pressure sensor. The Wheatstone bridge detects this change in resistance whose output is proportional to a change in pressure. The mechanical deflection of the first membrane 425 resulting from the progressive release of mechanical stress is thus calibrated as (offset voltage (Voffset)) by the first pressure sensing element, while the second pressure sensing element and associated membrane 425 simultaneously detects a pressure to be measured within cavity 415. The sensed pressure detected by the second pressure sensing element, however, is compensated or offset by the electronic circuitry 465 to correct for the mechanical deflection of the first membrane 425 (Voffset) detected or calibrated by the first pressure sensing element resulting from the progressive release of mechanical stress. This corrected pressure sensor measurement or reading therefore has an improved pressure reading response.

It should be noted that the present inventive absolute piezo-resistive pressure sensor has been described as being for a medical purpose and implanted in the body. The scope of the present invention is equally suited for non-medical as well as medical applications outside the body. Nothing in this description is intended to limit the scope of the present invention to a particular application or use.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. An absolute piezo-resistive pressure sensor system comprising:
 a single wafer having respective first and second cavities etched therein forming respective first and second deflectable membranes serving as respective first and second pressure sensing elements; the first deflectable membrane having an aperture defined therethrough, while the second deflectable membrane does not; a first surface of each of the first and second deflectable membranes being exposed to a pressure within the respective first and second cavities; an opposing second surface of each of the first and second deflectable membranes being enclosed in a common hermetically sealed chamber formed by a cover assembled to the single wafer, wherein a pressure within the chamber is substantially constant;

a piezo-resistive material is assembled to the opposing second surface of each of the first and second deflectable membranes subject to the same pressure within the sealed chamber; and a base plate having a single hole defined therein; the wafer being assembled to the base plate with the hole substantially aligned with the second pressure sensing element.

2. The system in accordance with claim 1, wherein the wafer is made of silicon and the base plate is made of glass.

3. The system in accordance with claim 1, wherein the aperture defined therethrough the first deflectable membrane has a diameter between approximately 0.05 mm-approximately 0.1 mm.

4. The system in accordance with claim 1, further comprising a cover assembled to the base plate to form a packaging that encapsulates the wafer forming the two pressure sensing elements in a hermetically sealed chamber at a substantially constant pressure.

5. The system in accordance with claim 1, wherein a material used to fabricate the single wafer has a different coefficient of thermal expansion than a material used to fabricate the base plate.

\* \* \* \* \*